United States Patent [19]

Eickhoff et al.

[11] Patent Number: 5,348,657

[45] Date of Patent: Sep. 20, 1994

[54] PROCESS FOR THE SEPARATION OF CATALYST-FREE WORKING SOLUTION FROM THE HYDROGENATION CIRCUIT OF THE ANTHRAQUINONE PROCESS FOR THE PRODUCTION OF HYDROGEN PEROXIDE

[75] Inventors: Hubert Eickhoff, Alzenau; Rüdiger Schirrmacher, Hanau; Karl-Heinz Mangartz, Rheinfelden; Hans-Martin Huber, Kirchlinteln-Hohenaverbergen; Ralf Godecke, Rodenbach, all of Fed. Rep. of Germany

[73] Assignee: Degussa Aktiengesellschaft, Frankfurt, Fed. Rep. of Germany

[21] Appl. No.: 61,513

[22] Filed: May 17, 1993

[30] Foreign Application Priority Data

May 25, 1992 [DE] Fed. Rep. of Germany ....... 4217245

[51] Int. Cl.$^5$ .............................................. B01D 61/00
[52] U.S. Cl. ............................ 210/636; 210/500.25; 210/500.26; 210/651; 423/588
[58] Field of Search ....................... 423/588, 651, 636; 210/500.25, 500.26, 652, 500.36

[56] References Cited

U.S. PATENT DOCUMENTS

| | | |
|---|---|---|
| 3,423,176 | 1/1969 | Kabisch et al. |
| 3,433,358 | 3/1969 | Herzog |
| 4,414,401 | 11/1983 | Wintermeyer et al. |
| 4,428,923 | 1/1984 | Kunkel et al. |
| 4,797,211 | 1/1989 | Ehrfeld et al. ................. 210/500.26 |
| 4,888,115 | 12/1989 | Marinaccio et al. ................. 210/651 |
| 4,992,178 | 2/1991 | Chaufer et al. ................. 210/651 |
| 5,047,154 | 9/1991 | Comstock et al. ................. 210/651 |
| 5,051,183 | 9/1991 | Takita et al. ................. 210/500.36 |
| 5,071,554 | 12/1991 | Seita et al. ................. 210/500.36 |
| 5,215,667 | 6/1993 | Livingston et al. ................. 210/651 |
| 5,230,804 | 7/1993 | Leupold et al. ................. 210/651 |
| 5,262,053 | 11/1993 | Meier ................. 210/636 |

FOREIGN PATENT DOCUMENTS

| | | |
|---|---|---|
| 1208619 | 7/1986 | Canada . |
| 0052719 | 6/1982 | European Pat. Off. . |
| 1064949 | 3/1960 | Fed. Rep. of Germany . |
| 3040631 | 10/1980 | Fed. Rep. of Germany . |
| 3245318 | 6/1984 | Fed. Rep. of Germany . |
| 4029784 | 9/1990 | Fed. Rep. of Germany . |
| 959583 | 6/1964 | United Kingdom . |
| 2236746 | 4/1991 | United Kingdom . |

OTHER PUBLICATIONS

Ullmann's Encyclopedia of Industrial Chemistry, 5th Edition (1989), vol. A 13, pp. 447–456 was cited at the end of page 2.

"State Of Mineral Membranes In The World" by Dr. D. Gerster as presented at the Fourth Annual Membrane Technology/Planning Conference, Nov. 5–7, 1986, Cambridge, Mass., pp. 152–159 was cited in the sentence bridging pp. 9–10.

*Primary Examiner*—Wayne Langel
*Attorney, Agent, or Firm*—Beveridge, DeGrandi, Weilacher & Young

[57] ABSTRACT

A process is disclosed for the separation of catalyst-free working solution from working solution containing palladium black of the hydrogenation circuit of the anthraquinone process for the production of hydrogen peroxide. The problem addressed was to improve the separation of a catalyst-free working solution from the hydrogenation circuit containing Pd black, which was previously carried out using filter candles, in order to reduce the process costs. This problem is solved by the use of a microfilter operating on the crossflow principle with a filter membrane of ceramic material, more particularly α-aluminum oxide, or polyolefin with an average pore diameter of 0.1 to 3.0 μm, preferably 0.1 to 1.5 μm, and more preferably 0.5 to 1.5 μm. The crossflow rate is generally 0.5 to 5 m/sec.

10 Claims, No Drawings

PROCESS FOR THE SEPARATION OF CATALYST-FREE WORKING SOLUTION FROM THE HYDROGENATION CIRCUIT OF THE ANTHRAQUINONE PROCESS FOR THE PRODUCTION OF HYDROGEN PEROXIDE

INTRODUCTION AND BACKGROUND

The present invention relates to a process for the separation of catalyst-free working solution from working solution containing palladium black of the hydrogenation circuit of the anthraquinone process for the production of hydrogen peroxide.

In the anthraquinone process for the production of hydrogen peroxide, also known as the AO process, a reaction support based on one or more 2-alkyl anthraquinones and tetrahydro-2-alkyl anthraquinones is converted with hydrogen into the corresponding hydroquinone form in an organic solvent system in the presence of a catalyst. After the hydrogenation stage, the working solution freed from the catalyst is treated with an oxygen-containing gas in the oxidation stage, the quinone form of the reaction support reforming with elimination of hydrogen peroxide. Finally, hydrogen peroxide is extracted from the oxidized working solution with water and the working solution, i.e. the mixture of the reaction support and solvent or solvent mixture, is returned to the hydrogenation stage. Full particulars of the AO process can be found in Ullmann's Encyclopedia of Industrial Chemistry, 5th Edition (1989), Vol. A 13, pages 447–456 and Kirk-Othmer Encyclopedia of Chemical Technology, 3rd Edition, volume 13, pages 12–38 (which is incorporated by reference).

Where suspension catalysts, such as palladium black for example, are used, the circuit of the hydrogenation stage (see, for example, U.S. Pat. No. 4,428,923 which is incorporated by reference) essentially comprises the actual reactor, a circulation pipe with a circulation pump, means for introducing and distributing the hydrogen, means for introducing working solution from the working solution drying stage following the extraction stage, and means for removing catalyst-free hydrogenated working solution, including a solid/liquid separator. U.S. Pat. No. 4,428,923 discloses a process for the production of hydrogen peroxide by the anthraquinone process which includes a step of the catalyst hydrogenation with hydrogen or a hydrogen containing gas using a working solution having palladium black suspended therein. The process employs a meandering tube system as the reaction space at a temperature up to 100° C. and a pressure up to 15 bar. The hydrogenation is carried out in a loop reactor made of tubes of the same nominal width and which are arranged vertically or horizontally and are connected by tube elbows of the same nominal width at a flow velocity in the tubes of at least 3 m/sec.

The quantitative and—in continuous operation—uninterrupted retention of the generally very finely divided suspension catalyst in the hydrogenation circuit during separation of part of the hydrogenated working solution, which is delivered to the oxidation stage, is a basic prerequisite for a safe and economic process. Accordingly, numerous references are concerned with this particular aspect, the solid/liquid separation being based on filtration using fine-pored filters and catalyst deposited on the filter surface being periodically removed therefrom either completely or in part by pressure reversal and being delivered to the hydrogenation circuit (see, for example CA-PS 1,208,619, GB-PS 959,583 and U.S. Pat. No. 3,433,358).

According to CA-PS 1,208,619, suspended hydrogenation catalysts with a particle spectrum of $75\% > 1$ $\mu m$ can be separated from a working solution for the production of hydrogen peroxide by using a filter medium of sintered steel particles having a maximum pore diameter of 8 $\mu m$. Satisfactory operation of the filter on a continuous basis necessitates backwashing at frequent intervals. Only suspension catalysts with the particle spectrum mentioned above can be separated. This process cannot be used for the separation of a catalyst-free working solution from a working solution containing a noble metal black, for example palladium black having a primary particle spectrum of 5 to 50 nm (see Example 3).

A particular embodiment of the hydrogenation circuit of the anthraquinone process for the production of hydrogen peroxide is disclosed in GB-PS 959,583. Part of the hydrogenated working solution is removed in catalyst-free form from the circulated working solution containing palladium catalyst by means of a filter in a filter housing through which the catalyst-containing working solution flows. The filter is periodically backwashed to free the surface of the filter at least from partly deposited catalyst. No particulars of the filter medium are provided in this document. A major disadvantage of this process is that the volume of catalyst-containing working solution present in the filter housing(s), based on the volume present in the hydrogenation circuit as a whole, is very considerable. Accordingly, this embodiment involves an undesirably high tie-up of capital.

Effective filter media for separating support-free noble metal catalysts, such as palladium black, are known from U.S. Pat. No. 3,433,358 (which is incorporated by reference). The filter media in question are filter candles of carbon material of which the pore diameter may be larger than the diameter of the particles to be separated and which have a wall thickness of at least 10 mm. In this case, also, one or more filter candles are arranged in a correspondingly shaped filter housing. Although this reference seeks to minimize the volume in the filter housings in order to reduce the capital tied up in the catalyst-containing working solution remaining in this unit, narrow limits are imposed by the design of the filter candles to maintain a certain filter area and have already been reached in practice. U.S. Pat. No. 3,433,358 discloses a process for the separation of a suspended finely divided unsupported noble metal catalyst having a primary particle size of between about 0.01 and 1 $m\mu$ from an organic liquid containing the suspended catalyst. The organic liquid is passed through a porous carbon filter having a maximum pore size of 15 $m\mu$ to filter off the suspended catalyst. Filter candles of the type mentioned above, which are periodically backwashed in operation, are used in the industrial production of hydrogen peroxide, for example by the process according to U.S. Pat. No. 4,428,923.

In the search to improve the production of hydrogen peroxide by the anthraquinone process in order to reduce costs, there is considerable interest in modifying the apparatus for separating a catalyst-free working solution from the hydrogenation circuit in such a way that the volume of working solution remaining in the solid/liquid separator and the quantity of catalyst present therein can be significantly reduced for the same filtration capacity.

DE-OS 32 45 318 describes a process for continuously carrying out gas/liquid pressure reactions using a suspended catalyst remaining in the reaction zone, in which part of the reaction liquid is removed from the reaction vessel using a microfilter operated on the crossflow principle. The microfilters are equipped with a tube, hose or plate module (polytetrafluoroethylene, polyvinylidene fluoride and sintered metals being mentioned as suitable materials for the module). The microfilter is periodically backwashed by pressure reversal between the retentate side and the permeate side of the microfilter. References to the production of hydrogen peroxide by the anthraquinone process using extremely fine noble metal blacks are as difficult to find in this document as references to the solution to the problem addressed by the present invention as stated above. Thus, the catalyst used by way of example in the process according to DE-OS 32 45 318 has an average particle size of around 1 $\mu$m whereas the primary particles of palladium black are between 5 and 50 nm in size. DE-OS 30 40 631 (U.S. Pat. No. 4,414,401 which is incorporated by reference) is based on a process principle similar to DE-OS 32 45 318: among the catalysts mentioned by way of example there is again no reference to the particularly fine-particle noble metal blacks.

SUMMARY OF THE INVENTION

The present invention relates to a process for the removal of catalyst-free working solution from working solution containing palladium black of the hydrogenation circuit of the anthraquinone process for the production of hydrogen peroxide using a microfiltration filter, the differential pressure between the retentate side and the permeate side being briefly reversed on a periodic basis, characterized in that the working solution containing palladium black is circulated through a microfilter operated on the crossflow principle with a filter membrane of ceramic material or polyolefin having an average pore diameter of 0.1 to 3.0 $\mu$m (particularly 0.1 to 1.5 $\mu$m) is used for the separation.

DETAILED DESCRIPTION OF THE INVENTION

It was not foreseeable that a completely catalyst-free working solution would be able to be removed from the hydrogenated working solution containing palladium black by means of a crossflow microfilter with the claimed filter membrane, even in continuous operation. The stated problem cannot be solved satisfactorily, if at all, using other filter materials: sintered metal filters of stainless steel with a pore diameter of 1.4 $\mu$m are neither sufficiently impervious to noble metal blacks nor can they be satisfactorily backwashed (see Example 3). In addition, in the sintered metal filter mentioned, so-called blockage of the pores soon occurs with an unacceptable reduction in the permeate flux; however, counteracting the unacceptable, rapid reduction in the permeate flux necessitates frequent stoppages to enable the membrane filters to be chemically cleaned.

Although a filter membrane of organic polymers other than polyolefins, for example fluorine-containing polymers, may have the necessary impermeability to noble metal blacks in individual cases, their mechanical stability is unsatisfactory and/or material failures occur at the welds and bonds between the filter membrane and other plastic parts of the housing, resulting in stoppages.

The pore volume for the polyolefin filter membrane of the present invention is usually in the range of 60 to 85% as described in Chem. Ing. Tech. (1986), volume 58, number 3, pages 240–241 (which is incorporated by reference in its entirety). Tube membranes of polyolefins usually have a thickness of 1 to 3 mm.

Whereas the maximum permitted differential pressure between the permeate side and the retentate side has to be limited to around 200 kPa in the case of a polypropylene membrane, microfilters with a filter membrane of a ceramic material can surprisingly be operated at much higher differential pressures. This is a major advantage of the microfilters of the present invention equipped with a ceramic membrane because the specific permeate flux increases with increasing transmembranal differential pressure. Accordingly, it is possible by increasing the transmembranal differential pressure to reduce the necessary filter area or the number of filters and hence the investment volume for the same filtration efficiency.

The filter membrane preferably consists of an oxidic ceramic material which is chemically inert to the working solution and which does not adsorb any constituents of the working solution, preferably an oxidic ceramic material of essentially $\alpha$-aluminum oxide (ordinary impurities and oxides can be presented for targeted dosaging in smaller amounts, generally below 7% by weight), the pore diameter preferably being between 0.1 and 1.5 $\mu$m and, more particularly, between 0.5 and 1.5 $\mu$m, the pore volume is usually in the range of 20 to 50%, and the membrane thickness is usually 5 to 20 $\mu$m. Such membranes are described in "State Of Mineral Membranes In The World" by Dr. D. Gerster as presented at the Fourth Annual Membrane Technology/Planning Conference, November 5–7, 1986, Cambridge, Massachusetts (which is incorporated by reference in its entirety, especially pages 152–159).

The construction principle of a microfilter with a filter membrane is known to those skilled in the art. One or more tube or hose, plate or wound modules, each containing the effective filter membrane, is/are arranged in a filter housing. The membrane layer is situated on a coarse-pored support layer of the same material or a different material. The filter modules are arranged in the housing in such a way that they separate the retentate side from the permeate side. So-called tube modules, particularly in the form of multichannel elements, are suitable for the process according to the present invention. The multichannel elements are elongate cylindrical elements with several round or elliptical longitudinal channels. The element itself consists of a porous material, preferably an oxide ceramic, more particularly one based on $\alpha$-aluminum oxide. The actual filter membrane is situated on the wall of the channels. The channels are typically between 1 and 10 mm in diameter. Multichannel elements with a channel diameter of 2 to 6 mm are particularly suitable for the process according to the invention. By virtue of the construction, a large filter area is thus concentrated in a confined space. It is possible in this way to accommodate a large filter area and hence a large filter capacity in a confined space. This is an advantage of considerable importance in the claimed process because investment volume and the space required in a plant can be considerably reduced in this way.

The filter area is dependent on the selected membrane, the transmembrane pressure difference, and flow. Calculating the area needed to solve a filtration problem is a routine matter for a person skilled in the art.

As mentioned above, filter candles are used in the known process. To achieve the necessary stability and filter capacity, these filter candles are several times larger in their internal diameter. Accordingly, by comparison with the filter unit according to the present invention, known filter candles necessitate much larger filter housings. At the same time, the channel volume of the filter elements according to the present invention, through which the palladium-containing working solution flows, is considerably smaller than the corresponding volume in the filter housing for the filter candles. Accordingly, changing from the known filter candles to the filter elements according to the present invention also provides for a distinct reduction in the holdup of working solution and palladium (see Example 4).

The flow rate of the palladium-containing working solution transversely of the filtration direction is generally adjusted to values of 0.5 to 5 m/s, a flow rate of 1 to 2 m/s being preferred. By virtue of these unexpectedly low flow rates, the pressure loss and hence the specific energy demand of the process according to the present invention are minimal. The pressure of the hydrogenation circuit prevails on the retentate side during the filtration process; the pressure difference towards the permeate side will be greater than zero and hence lower than the pressure on the retentate side. In the process according to the present invention, the transmembranal differential pressure is preferably greater than 200 and smaller than 500 kPa. Using the preferred filter elements with a membrane of $\alpha$-aluminum oxide, the specific permeate flux increases linearly over a wide range with increasing transmembranal pressure difference (see Example 1).

For backwashing, the pressure between the retentate side and the permeate side is reversed to maintain a constant high mean value of the permeate flow. Microfilters with a filter membrane according to the present invention can be effectively backwashed and are distinguished by high specific fluxes in an average cycle. Surprisingly, and this is another advantage of the process according to the present invention, the specific permeate flux ($m^3$/h and $m^2$) is considerably greater than in the case of filtration using known filter candles. It is thus possible to reduce the installed filter area in the process according to the present invention in relation to the known process. Another advantage of the process according to the present invention is that, even after long periods of operation, no catalyst deposits occur either in the filter housings or in the filter elements.

The measures according to the present invention for separating a catalyst-free working solution from a hydrogenated working solution containing suspension catalysts can be implemented very effectively in all known AO processes using palladium black. Information on how the hydrogenation stage is carried out and on suitable apparatus can be found in U.S. Pat. Nos. 4,428,923 and 3,423,176 (which are incorporated by reference) and in DE-OS 40 29 784.

U.S. Pat. No. 3,423,176 discloses an apparatus for the catalytic dehydrogenation of a substance capable of hydrogenation in a heterogeneous system essentially composed of a hydrogenation gas, a liquid comprising the substance to be hydrogenated and a solid suspension catalyst. The apparatus involves a hydrogenation chamber formed of a plurality of adjacent vertical tubes connected in series by elbows alternately connecting the tops and bottoms thereof, pump means for passing the mixture of the components of the hydrogenation system in concurrent flow through the hydrogenation chamber at a velocity of at least 0.5 m/sec. The cross-section of the tubes of the hydrogenation chamber in which the mixture flows downwardly is larger than that of the tubes in which the mixture flows upwardly. The apparatus includes means for recycling the liquid containing the substance to be hydrogenated and the hydrogenated product and the suspension catalyst leaving the end of the hydrogenation chamber to the beginning of the hydrogenation chamber including the pump means. The apparatus contains means for introducing the hydrogenation gas into the recycled liquid and suspension catalyst on the pressure side of the pump means. Filter means, connected to the recycling means, are adapted and arranged to filter off the suspension catalyst from a portion of the liquid being recycled and withdrawing the portion of the liquid from the cycle. Means are present for introducing fresh liquid containing the substance to be hydrogenated to the liquid being recycled to replace the liquid containing the substance to be hydrogenated and the hydrogenated product is withdrawn through the filter means.

U.S. Pat. No. 4,414,401 discloses a process for producing diacetone ketogulonic acid where diacetone sorbose is oxidized in aqueous alkaline solution in the presence of a suspended nickel hydroxide catalyst. The gelatinous catalyst is separated from diacetone ketogulonic acid and separately recovered. The gelatinous nickel hydroxide catalyst is separated by a process involving circulating the aqueous reaction mixture in contact with the surface of a microfiltration membrane at a flow rate such that its Reynolds number is at least about 1000, the pressure drop across the membrane being about 0.5–100 bar. The pressure drop across the membrane is periodically reversed for a time interval sufficient to flush occluded catalyst out of the pores of the membrane by the brief reverse flow of permeate. Separately recovered is a permeate containing diacetone ketogulonic acid and a retentate of concentrated, substantially fully active nickel hydroxide catalyst which is uncontaminated by filter aids and suitable for recycling directly to the oxidation without regeneration.

The invention is illustrated by the following Examples and Comparison Examples.

EXAMPLES

Examples 1 to 3

Determination of the effectiveness of various filter modules for the separation of catalyst-free working solution from working solution containing Pd black:

In a pilot-plant apparatus, palladium-containing working solution was circulated by a pump through the filtration module operated on the crossflow principle via a tank B1. The permeate entering the shell space of the module through the filter medium is also returned to the tank B1 via a tank B2 and a safety filter. Backwashing takes place from the tank B2. A working solution essentially based on an aromatic hydrocarbon boiling at 185° to 205° C., tetrabutyl urea as solvent and a mixture of 2-ethyl anthraquinone and 2-ethyltetrahydroanthraquinones as reaction support was used for the tests. The Pd content in the circuit was adjusted to approximately 2 g/l.

Example 1

Commercially available multichannel ceramic filter elements with an internal channel diameter of approximately 3 mm were used in the apparatus described above: filter membrane of essentially α-aluminum oxide (99.95%); mean pore diameter approximately 0.2 μm; pore volume 30%; thickness of membrane 8 to 12 μm; filter area 0.44 m². Support material (support) α-aluminum oxide, pore diameter 7 to 11 μm, pore volume approximately 30%.

As can be seen from Table 1 below, the specific permeate flux increases with increasing mean trans-membranal pressure difference (as measured immediately after backwashing). The influence of the crossflow rate is minimal up to a transmembranal differential pressure of approximately 400 kPa.

TABLE 1

| Mean trans-membranal pressure difference kPa | Specific permeate flux (l/m²h) | |
| --- | --- | --- |
| | Crossflow 1.5 m³/h | Crossflow 3 m³/h |
| 40 | | 180 |
| 100 | 580 | 580 |
| 140 | 820 | |
| 170 | | 1140 |
| 250 | 1540 | |
| 270 | | 1700 |
| 350 | | 2380 |
| 360 | 2340 | |
| 425 | 2560 | |
| 500 | | 3220 |
| 570 | 2980 | 3430 |

The module is impermeable to palladium black. Backwashing is necessary to maintain a constant average permeate flux. A backwashing time of 10 seconds for a filtration time of 10 minutes is sufficient to maintain the desired mean permeate flux over prolonged operating times.

Example 2

A filter module with 43 filter tubes with a filter membrane of polypropylene in a support tube of stainless steel was used; membrane pore diameter 0.2 μm; filter area 1 m²; crossflow rate 1 m/s.

The membrane was impermeable to palladium black and could be effectively backwashed. In the permitted range (to max. 200 kPa) the permeate flux increases linearly and substantially independently of the crossflow rate, amounting to 750l/m²h for a transmembranal pressure difference of 150 kPa.

Example 3 (Comparison)

A sintered metal filter of stainless steel with a pore diameter of 1.4 μm was used; filter area 0.1 m². Permeate flux was studied as a function of the filtration time using the following cycle times: filtration 300 s, expansion 1.5 s, backwashing 15 s, circulation volume 6.5 m³/h. Pressure before the filter 400 kPa, after the filter 100 kPa.

The filter was not impermeable to palladium black. In addition, permeate flux falls by more than 50% of the initial value in the first 12 cycles. Accordingly, the blockage of the filter element cannot be eliminated by backwashing.

Example 4

In a plant for the production of hydrogen peroxide by the AO process, filter candles are installed in a filter housing according to U.S. Pat. No. 3,433,358 to separate working solution free from Pd black from the hydrogenation circuit according to U.S. Pat. No. 4,428,923. The replacement of this filter unit by a filter unit according to the present invention comprising filter elements according to Example 1 affords major advantages for the same forward flow (=permeate volume/h), as listed in the following in relation to the values of the prior art:

Specific permeate flux: increased by a factor of 1.6
Filter area: reduced by approx. 40%
Volume of working solution in the total number of filter housings required: reduced by 89%
Total amount of palladium remaining in the filter unit (in the suspension and on the filter surface): reduced by 93%

Example 5

In a production plant for the production of hydrogen peroxide, the process according to the present invention was carried out in the bypass for four weeks under the following conditions:
Membrane area: 3.1 m²
Membrane material: α-Al₂O₃, pore diameter approx 0.2 μm
Filtrate capacity: 5.9 m³/h
Transmembranal pressure difference: 240 kPa
Crossflow rate: 1.85 m/s
Filtration time to backwashing time: 300 s/10 s No malfunctions occurred. In the subsequent inspection, no catalyst deposits were found either in the filter housing or in the filter elements.

Example 6

In a production plant for the production of hydrogen peroxide, the process according to the present invention was carried out in the by-pass for 6000 hours under the following conditions:
Membrane area: 2.8 m²
Membrane material: α-Al₂O₃, pore diameter 1 μm
Filtrate capacity: 7.0 m³/h
Transmembranal pressure difference: 200 kPa
Crossflow rate 1.7 m/s
Filtration time to backwashing time: 500 s/10 s
Pd-content in the filtrate: less than 0.5 ppb (parts per billion, which is the detection limit)

No malfunctions occured during the experimental period. The palladium was retained quantitatively despite a pore diameter of 1 μm of the membrane.

Further variations and modifications of the foregoing will be apparent to those skilled in the art and such variations and modifications are attended to be encompassed by the claims that are appended hereto.

German Priority Application P 42 17 245.4, filed on May 25, 1992, is relied on and incorporated by reference.

What is claimed:

1. A process for the removal of catalyst-free working solution from working solution containing palladium black of the hydrogenation circuit of the anthraquinone process for the production of hydrogen peroxide using a microfiltration filter, the differential pressure between the retentate side and the permeate side being briefly reversed on a periodic basis, said process comprising passing said working solution containing palladium black through a microfilter operated on the crossflow principle with a filter membrane of ceramic material or polyolefin having an average pore diameter of 0.1 to 3 μm.

2. The process according to claim 1, wherein said filter membrane comprises oxidic ceramic material and the average pore diameter is in the range from 0.1 to 1.5 μm.

3. The process according to claim 2, wherein said average pore diameter is in the range from 0.5 to 1.5 μm.

4. The process according to claim 2, wherein said oxidic ceramic material is α-aluminum oxide.

5. The process according to claim 1, wherein the flow rate transversely of the filtration direction is between 0.5 and 5 m/sec.

6. The process according to claim 5, wherein the flow rate transversely of the filtration direction is between 1 and 2 m/sec.

7. The process according to claim 1, wherein said filter membrane comprises polyolefin and the average pore diameter is in the range from 0.1 to 3.0 μm.

8. The process according to claim 1, wherein the transmembranal differential pressure is more than 200 and less than 500 kPa and wherein said filter membrane comprises oxidic ceramic material.

9. The process according to claim 3, wherein said average pore diameter is approximately 1 μ.

10. The process according to claim 1, wherein the transmembranal differential pressure is between 150 to 200 kPa and wherein said filter membrane comprises polypropylene.

* * * * *